United States Patent

[11] 3,607,903

| [72] | Inventors | Zoltan Csuros<br>Budapest;<br>Rudolf Soos, Budapest; Jozsef Bozzay, Budapest; Janos Dancso, Budapest; Dezso Ambrus, Budapest; Jozsef Haraszti, Sajobabony, all of Hungary |
|---|---|---|
| [21] | Appl. No. | 682,543 |
| [22] | Filed | Nov. 13, 1967 |
| [45] | Patented | Sept. 21, 1971 |
| [73] | Assignee | Chemokomplex Vegyipari Gep es Berendezes Export-Import Vallalat Nepkoztarsasag utja, Budapest, Hungary |
| [32] | Priority | Nov. 18, 1966 |
| [33] | | Hungary |
| [31] | | CU-102 |

[54] PREPARATION OF AROMATIC ISOCYANATES
8 Claims, No Drawings

[52] U.S. Cl. .................................................. 260/453 PH
[51] Int. Cl. ..................................................... C07c 119/04
[50] Field of Search ........................................ 260/453 A, 453 PA

[56] References Cited
UNITED STATES PATENTS

| 3,234,253 | 2/1966 | Cooper | 260/453 |
| 2,683,160 | 7/1954 | Irwin | 260/453 |
| 2,822,373 | 2/1958 | Beck | 260/453 |

*Primary Examiner*—Charles B. Parker
*Assistant Examiner*—Dolph H. Torrence

ABSTRACT: A continuous process for the preparation of aromatic monoisocyanates, diisocyanates, or mixtures thereof, by contacting a corresponding amine with an amount of phosgene being in excess of that which is stoichiometrically required for the conversion of the amine, at a temperature between about 120° C. and about 200° C. The improvement of the invention comprises carrying out the reaction in two successive steps. Partial conversion, suitably up to between about 75 percent and about 88 percent of the starting amine, is accomplished in the first step, such as by contacting the amine with a preheated solution of suitably as much phosgene as is stoichiometrically required for the first step of the process. The product resulting from the first step is contacted in the second step with a further amount of phosgene which is in excess, preferably an excess of between about 5 percent and about 20 percent, over the amount of phosgene stoichiometrically required for substantially completing the conversion.

PREPARATION OF AROMATIC ISOCYANATES

Among the known processes for preparing isocyanates the one best suited for industrial realization is the process in which suitable amines and phosgene are used as starting materials, and in which the following reaction takes place:

$$R-NH_2 + COCl_2 \rightarrow R-NCO + 2HCl$$

This reaction consists of two steps and can be subdivided into the following two reaction schemes:

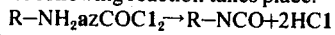

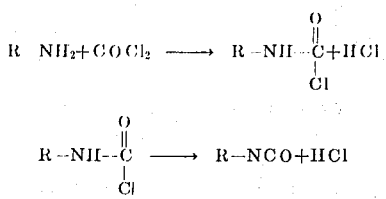

In the first step a carbamyl chloride is formed at low temperature; in the second step, after hydrogen chloride has been split off, it is decomposed into the isocyanate at elevated temperatures (at least 100° C.). The evolved hydrochloric acid forms a salt with the amine, the hydrochloric salt of the amine also reacts with the phosgene and is converted into isocyanate at a suitable temperature.

Various methods have become known for carrying out the above reaction in practice. In one group of processes suited for industrial use the reaction is carried out in two steps. The first step is the so-called cold phosgene treatment, where a suspension or solution of the starting amine, for example a solution or suspension of the amine in carbonic acid, is reacted in the cold with phosgene or a solution of phosgene in an inert solvent. In the second step, the so-called warm phosgene treatment, phosgene is introduced into the reaction mixture at elevated temperatures until the conversion takes place at the maximum rate to be achieved.

According to the German Specifications Nos. 949,227; 949,228 and 952,086 the reaction of amine with phosgene is performed in two steps. In order to reduce the amount of phosgene required, i.e. to increase the yield, in the first step a mixture is prepared from the reactants and the mixture is treated for example at ambient temperature with phosgene. The reaction then proceeds in the second step at the temperature of warm phosgene treatment in either continuous or batch process, e.g. in tubular reaction vessels. By these known processes the isocyanate end product can be obtained with a yield of 70 to 80 percent calculated on the starting amine. The technological equipment and apparatus required for putting into practice this process involves high costs, as the warm phosgene treatment requires a comparatively high excess of phosgene. Owing to the length of the reaction period, the end product becomes increasingly tarry.

In the U.S. Pat. No. 2,683,160 a batch, continuous, or semicontinuous process is described for preparing isocyanates in one step omitting the step of cold treatment with phosgene. According to this process, the stoichiometric excess of phosgene over the amine is at least 50 percent preferably 80 to 100 percent. Reduction of excess phosgene is said to result in a reduction of the yield. Another disadvantage of this process, in addition to the extremely high excess of phosgene, is that with continuous or semicontinuous operation amine, in an amount corresponding to the equilibrium value escapes from the reaction vessel together with the isocyanate, resulting in inefficient operation.

With the known processes a 80 to 100 percent stoichiometric excess of phosgene will only produce a 90 to 92 percent conversion at the most.

The object to be achieved is therefore to reduce the excess of phosgene required for preparing the isocyanates, to increase further the yield and to cut down to a minimum the amount of byproducts of side reactions.

It has been found that in accordance with the present invention aromatic monoisocyanates, diisocyanates, or a mixture thereof, can be prepared in a continuous process by converting with phosgene in an organic solvent medium in the temperature range of the so-called warm phosgene treatment, i.e. in the range of 120 to 200° C., with an improved yield and using a smaller excess of phosgene than conventionally, if the reaction is carried out in two successive stages, such as in two reaction vessels coupled from each other such as by two reaction vessels coupled in a cascade system, with an excess of phosgene not exceeding 5 to 20 percent calculated on stoichiometric amount.

The term "continuous" as used herein, is intended also to refer to a semicontinuous process. Suitably in the first stage the reaction is carried out instantaneously with continuous introduction of phosgene and amine in the first reaction vessel containing phosgene and amine in the first reaction vessel containing phosgene dissolved in a preheated organic solvent, up to a conversion of about 75 to 88 percent, using approximately the stoichiometric amount of phosgene. In the second stage the amount of phosgene used for treating the partly converted reaction mixture is such as to produce a 5 to 20 percent stoichiometric excess. Hence, the reaction can be almost entirely completed in the second stage.

The process according to the invention can be suitably carried out continuously in two heatable reaction vessels such as made of acid-resistant steel, conveniently provided with an agitator. The reaction vessels can be fitted with inlets for the introduction of phosgene and dissolved amine, and with outlets for withdrawal of the reaction mixture and the end product. A reflux cooler can be also attached for withdrawing the excess phosgene and hydrogen chloride gas evolved during the reaction.

At the start of the reaction the amine solution, suitably preheated to about 100° C., is introduced into the first reaction vessel simultaneously with the phosgene, in which a phosgene solution heated up to its boiling point and dissolved in an organic solvent had been previously placed. An essential consideration in selecting the solvent, is that it be inert in the reaction, furthermore, while being a good solvent for phosgene it should not readily dissolve hydrogen chloride. The boiling point of the solvent must be below that of the amine, however, it should be suitably 160° C. Accordingly, chlorinated aromatic hydrocarbons, for example o-dichlorobenzene are among the suitable solvents. The amine is preferably used in an about 15 percent solution.

If the phosgene is added in a stoichiometric amount calculated on the amine, then the first reaction takes place practically instantaneously, with an about 75 to 88 percent conversion and free of byproducts.

The reaction mixture, containing the predominantly converted starting amine is transferred from the first reaction vessel through an overflow, preferably by gravity force, into a second reaction vessel of substantially identical structure and suitably being at the same temperature as the first vessel. Simultaneously with the reaction mixture phosgene is admitted into the second reaction vessel in such an amount that the total amount of phosgene introduced into the two reaction vessels should suitably be 1.05–1.2 times the amount of phosgene required stoichiometrically for the entire reaction.

The preferred temperature for the reaction varies in the range between 120 and 200° C., depending on the amine component employed. The yield is considerably reduced, if one works above or below this temperature range.

In the second reaction vessel, the isocyanate is formed with a 93 to 96 percent conversion rate, calculated on the total amine amount initially introduced. The reaction mixture withdrawn from the second reaction vessel is transferred to a collecting vessel where the hydrogen chloride and the small amount of residual phosgene is flushed out by an inert gas, for example nitrogen.

The isocyanate obtained as end product of the process according to the invention is of very high purity. After vacuum distillation to remove the solvent and any trace impurities, an isocyanate of practically 100 percent purity is obtained. The lation, can be recycled to the first step without any separate cleaning operation. The insignificant amount of excess phosgene departing from the two reaction vessels after being freed from hydrochloric acid, can also be recycled.

In view of the generally prevailing level of the art it is surprising to find that isocyanates can be obtained in a solvent, at the temperature of what is commonly termed "warm phosgene treatment," by reacting amines with phosgene in two consecutive steps but under identical conditions of reaction, practically without side reactions, with a yield of 93 to 96 percent and with a smaller excess of phosgene than in the conventional processes. With the aid of the invention this can be achieved by means of relatively simple apparatus, e.g. by introducing the phosgene component in two steps into two reaction vessels, the first vessel containing a phosgene solution and being connected from the second vessel by a cascade system.

The process according to the invention is extremely well suited for producing aromatic isocyanates on an industrial scale, since it lends itself to be carried out in a simple apparatus with a good yield, so that one can achieve an end product of high purity without having to resort to complicated technology.

The invention is more particularly described below by the following illustrative examples:

Example 1

Into a heatable acid-resistant steel reaction vessel of 2.8 l volume fitted with a reflux condenser and turbo agitator, and containing o-dichlorobenzene saturated with phosgene having a temperature of 160° C., the introduction of 2,6-tolylene-diamine dissolved in 15 percent o-dichlorobenzene and preheated to 100° C. is started simultaneously with the introduction of phosgene. The amine solution is introduced at a rate of 6 g. amine per minute, and phosgene at a rate of 9.6 g. per minute. The reaction mass is transferred from the first to the second reaction vessel through an overflow pipe. Phosgene is admitted to the second reaction vessel at a rate of 1.9 g. per minute. The reaction temperature is 160° C. in both reaction vessels. The reaction mixture is freed from phosgene and hydrogen chloride by flushing with dry nitrogen, also at 160° C. and then is subjected to vacuum distillation. The solvent obtained as forerun is recycled. 2,6-tolylene-diisocyanate is obtained with a yield of 94 percent calculated on the amine, with a 99.9 percent purity.

Example 2

One proceeds in a manner similar to example 1, with the difference that 2,4-tolylene-diamine is used as the amine component. A 96 percent yield of 2,4-tolylene-diisocyanate, calculated on the amine, is obtained. This product analyzes at 100 percent purity.

Example 3

The process is similar to that in examples 1 and 2, with the difference, however, that a mixture of 2,4-tolylene-diamine and 2,6-tolylene-diamine in a 80 to 20 ratio, is used as the amine component. The isocyanate isomers are obtained in a similar ratio with 100 percent purity. The yield, calculated on the amine, amounts to 95 percent.

Example 4

Diphenyl-methane-p,p'-diamine is reacted with phosgene in accordance with example 1. Diphenylmethane-p,p'-diisocyanate is obtained in a 99.8 percent purity. The amine is introduced at a rate of 6 g. amine per minute. Phosgene is introduced at a rate of 6 g. per minute in the first reaction vessel and at a rate of 1.1 g. per minute in the second one.

What we claim is:

1. In a continuous process for the preparation of aromatic monoisocyanates or diisocyanates by conversion of the corresponding amine with phosgene, the phosgene being in excess of the amount stoichiometrically required for the conversion, the conversion being carried out at a temperature between about 120° C. and about 200° C., the improvement which comprises contacting in a first step a substantially saturated solution of phosgene in an organic solvent with a solution of phosgene in an organic solvent with a solution of the amine and further amounts of phosgene thereby converting between about 75 percent and 88 percent of the amine into a corresponding isocyanate, and in a second step contacting the resulting mixture with additional phosgene thereby to complete the conversion, the maximum excess of phosgene used throughout the process being 20 percent over the stoichiometrically required amount.

2. The improvement of the process of claim 1, wherein a preheated solution of phosgene is contacted with a monoamine or a diamine in the first step, the amount of phosgene in the first step not substantially exceeding the amount stoichiometrically required for converting between about 75 percent and about 88 percent of the amine into a monoisocyanate or a diisocyanate, said excess of phosgene being introduced in the second step in an amount between about 5 percent and about 20 percent over the amount stoichiometrically required for the entire process.

3. The improvement of the process of claim 1, wherein said excess of phosgene is between about 5 percent and about 20 percent over the stoichiometrically required amount.

4. The improvement of the process of claim 3, wherein said first step is carried out in a first reaction vessel, and said second step is carried out in a second reaction vessel, said first and said second reaction vessels being coupled from each other by a cascade system.

5. The improvement of the process of claim 4, further comprising the steps of recovering from the second step the solvent and optionally also recovering unreacted phosgene for recycling.

6. The improvement of the process of claim 1, wherein the amine is at least one of 2,4-tolylene diamine, 2-6-tolylene diamine, and diphenylmethane-p,p'-diamine.

7. The improvement of the process of claim 1, wherein the organic solvent is a chlorinated aromatic hydrocarbon.

8. The improvement of the process of claim 7, wherein the solvent is o-dichlorobenzene.